US 7,055,139 B2

(12) United States Patent
Balle et al.

(10) Patent No.: US 7,055,139 B2
(45) Date of Patent: May 30, 2006

(54) MULTIPROCESS DEBUGGING USING MULTIPLE CONVENTIONAL DEBUGGERS

(75) Inventors: Susanne M. Balle, Hudson, NH (US); David C. P. LaFrance-Linden, Arlington, MA (US); Bevin R. Brett, Brookline, NH (US); Alexander E. Holmansky, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 609 days.

(21) Appl. No.: 10/109,287

(22) Filed: Mar. 28, 2002

(65) Prior Publication Data

US 2003/0188294 A1    Oct. 2, 2003

(51) Int. Cl.
   *G06F 9/44* (2006.01)
(52) U.S. Cl. ................... 717/128; 717/219
(58) Field of Classification Search ........ 717/168–178, 717/128, 129; 714/35, 38, 4
   See application file for complete search history.

(56) References Cited

U.S. PATENT DOCUMENTS

| | | | | |
|---|---|---|---|---|
| 2002/0184477 A1* | 12/2002 | Swaine et al. | ............... | 712/227 |
| 2003/0061550 A1* | 3/2003 | Ng et al. | ............... | 714/45 |
| 2003/0177476 A1* | 9/2003 | Samara et al. | ............. | 717/128 |
| 2004/0111707 A1* | 6/2004 | Bliss et al. | ............... | 717/129 |

OTHER PUBLICATIONS

Dorian C. Arnold et al., *A Multicast/Reduction Network for Scalable Control and Data Collection*, Mar. 5, 2001 (39 p.).

Philip C. Roth, *A Path to Performance Diagnosis on 1000+ Nodes*, Mar. 5, 2002 (33 p.).

A. Waheed et al., *Modeling And Evaluating Design Alternatives For An On-Line Instrumentation System: A Case Study*, IEEE Transactions on Software Engineering, vol. 24, No. 6, Jun. 1998, pp. 451-470.

R. Hood et al., *A Debugger For Computational Grid Applications*, MRJ Technology Solutions-Numerical Aerospace Simulation Division, NASA Ames Research Center (9 p.).

R. Hood et al., *A Debugger For Computational Grid Applications*, Computer Sciences Corporation, NASA Ames Research Center, IPG Workshop, Sep. 19, 2000, pp. 1-12.

* cited by examiner

*Primary Examiner*—Wei Zhen
*Assistant Examiner*—Mulubrhan Tecklu (57) ABSTRACT

A computer system includes an aggregator network that couples a plurality of processes on which an application executes to a debugger user interface. Using the debugger user interface, commands are created and sent through the aggregator network to the processes and messages from the processes are routed through the aggregator network to the debugger user interface. Whenever possible, the aggregator network combines the processors' messages into fewer messages and provides a reduced number of messages to the debugger user interface. The aggregated messages generally contain the same information as the messages they aggregate and identify the processes from which the messages originated. The aggregator network examines the processor messages for messages that have identical or similar data payloads and aggregates messages that have identical or similar payloads.

26 Claims, 4 Drawing Sheets

| PROCESS SET | DISPOSITION |
|---|---|
| 0:2 | AGG.120 |
| 3:5 | AGG.124 |
| 6:8 | AGG.126 |

FIG.7a

| PROCESS SET | DISPOSITION |
|---|---|
| [0:8] | AGG.128 |

FIG.7b

| PROCESS SET | DISPOSITION |
|---|---|
| [3] | DEBUG SERVER-PROCESS 3 |
| [4] | DEBUG SERVER-PROCESS 4 |
| [5] | DEBUG SERVER-PROCESS 5 |

FIG.7c

MULTIPROCESS DEBUGGING USING MULTIPLE CONVENTIONAL DEBUGGERS

STATEMENT REGARDING FEDERALLY SPONSORED RESEARCH OR DEVELOPMENT

This project has been funded by the Maryland Procurement Office under Contract Number MDA904-99-G-0703/005.

CROSS-REFERENCE TO RELATED APPLICATIONS

Not applicable.

BACKGROUND OF THE INVENTION

Field of the Invention

The present invention generally relates to a debugger for a multiprocessor system. More particularly, the invention relates to a debugger that uses a "tree" communication structure comprising communication nodes that aggregate messages from debugging a plurality of processes and provide aggregated, as well as unaggregated, messages, to a debugger user interface.

Background of the Invention

A computer program comprises a set of instructions which are executed by a processor. A software designer writes the program to perform one or more functions. An error in the program (referred to as a "bug") may cause the program to operate in an unpredictable and undesirable manner. Accordingly, a computer programmer must debug the program to help ensure that it is error free.

The process of debugging a computer program generally requires the ability to stop the execution of the program at desired points and then check the state of memory, processor registers, variables, and the like. Then, the program can continue to execute. To facilitate the debug process, debug tools (i.e., software) are available which permit a programmer to debug the software. Debug programs have numerous features such as the ability to set break points in program flow, single stepping through a program (i.e., executing one instruction at a time and then stopping), viewing the contents of memory and registers, and many other features useful to the debugging process.

The computer field has seen numerous advancements over the years. One significant advancement has been the development of multiprocessor computer systems (i.e., computer systems having more than one processor). Multiprocessor systems permit more than one instruction to be processed and executed at time. This is generally called "parallel processing." The instructions being concurrently executed may be instructions from the same program or different programs.

Although debugging a computer program that runs on a single processor computer can, at times, be difficult enough, debugging a computer program that runs on multiprocessors concurrently adds considerable complexity. For example, the debugging process may require checking on and keeping track of the status of registers and memory associated with a multitude of processors in the system. Additional complications occur when debugging a multiprocessor system and those complications can best be understood with reference to FIG. 1.

Figure 1:
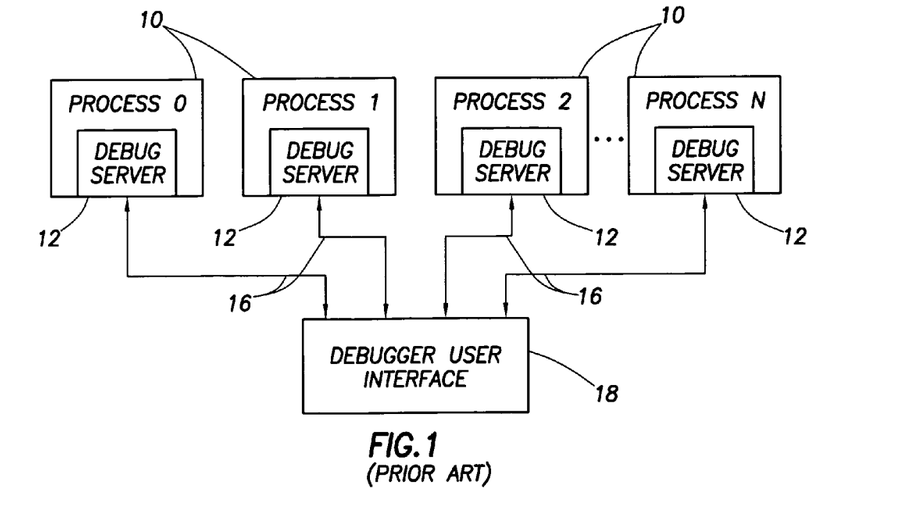
FIG. 1 shows a conventional debug architecture in which a debugger user interface includes a separate communication channel to each process debug server in the system.

FIG. 1 shows a conventional multiprocessor system comprising a plurality of application processes 10 (labeled as "Process 0," "Process 1," and so on). Each application process 10 comprises at least one processor and may include more than one processor. The debugging of application software that runs on the various processes 10 can be controlled and monitored via a debugger user interface 18 which has a separate communication channel 16 to/from a debug server 12 associated with each process. Through interface 18 a person can, for example, set break points, examine register contents, etc. As shown, each process 10 is associated with a debug server 12 which may be a computer program that actually causes the actions desired by the computer programmer to occur. The debug server 12 may be embedded in the associated process or be separate from the process. In general, the debug servers 12 cause the debugging actions to occur that the programmer feels are necessary to debug the application and provides status information and memory/register data back to the debugger user interface 18.

The architecture shown in FIG. 1 works generally satisfactory for systems having relatively few processes. This is true for several reasons. First, many operating systems limit the number of communication channels 16 that can be open concurrently for a given process. Thus, the number of communication channels that can be open at a time pertaining to the debugger user interface 18 (which itself is a process) may be limited to a number that is less than the number of processes 10 in the system.

Timing can also become a problem for debuggers in the multiprocessor architecture shown in FIG. 1. It takes a finite amount of time to process a message from a debug server 12. This amount of time is accumulated when considering processing responses from all of the debug servers 12. For example, if it takes 1 millisecond for the interface 18 to process a message from one debug server 12 and the system includes 2000 processes, then it would take as much as 2 seconds (2000 milliseconds) to finish processing a message in response to a single command to the interface 18. This delay can detrimentally interfere with the debugging process.

The problems described above become more severe as the number of processes increases. Accordingly, a solution to these problems is needed. Such a solution would permit a more efficient debug operation for multiprocessor systems.

BRIEF SUMMARY OF THE PREFERRED EMBODIMENTS OF THE INVENTION

The problems noted above are solved in large part by providing a computer system with an aggregator network that fans out commands and aggregates messages. A preferred embodiment of the computer system includes a plurality of processes on which an application executes, the aggregator network and a debugger user interface. Using the debugger user interface, commands can be created and sent through the aggregator network to debug servers associated with the processes. Further, messages from the debug servers are routed through the aggregator network to the debugger user interface. The aggregator network preferably, whenever possible, combines the debug servers' messages into fewer messages and provides a reduced number of messages to the debugger user interface.

The aggregated messages generally contain the same information as the messages they aggregate and identify the debug servers from which the messages originated. The aggregator network examines the debugger server messages for messages that have identical or similar data payloads. Messages with identical data payloads can be easily combined into a single message that indicates which debug servers generated the identical messages. Messages with non-identical payloads having some common data values can also be aggregated. A message that aggregates messages with similar, but not identical, payloads preferably identifies the identical portions of the payload and the non-identical portions along with an identification of the debug servers associate with the non-identical portions. Not all messages can necessarily be aggregated and such unaggregated messages are also routed from the processes through the aggregator network to the debugger user interface.

The debugger user interface can store and process the messages in their aggregated form or convert the aggregated messages to their unaggregated form. This feature is selectable via the debugger user interface.

This aggregation of processor message alleviates the burden on the debugger user interface which otherwise would have to be capable of receiving and processing many more messages. Further, the aggregator network is one preferred form of a multi-layer communication network that comprises a plurality of communication nodes that permit a plurality of processes to send messages to a single debugger user interface, and commands to be routed to the processes. Such a multi-layer communication network provides an architecture in which all processes have open and active communication channels despite reasonable limitations imposed by the operating system on the number of communication channels to/from an individual process. These and other advantages will become apparent upon reviewing the following disclosures.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. In addition, no distinction is made between a "processor," "microprocessor," "microcontroller," or "central processing unit" ("CPU") for purposes of this disclosure. To the extent that any term is not specially defined in this specification, the intent is that the term is to be given its plain and ordinary meaning.

DETAILED DESCRIPTION OF THE PREFERRED EMBODIMENTS

Figure 2:
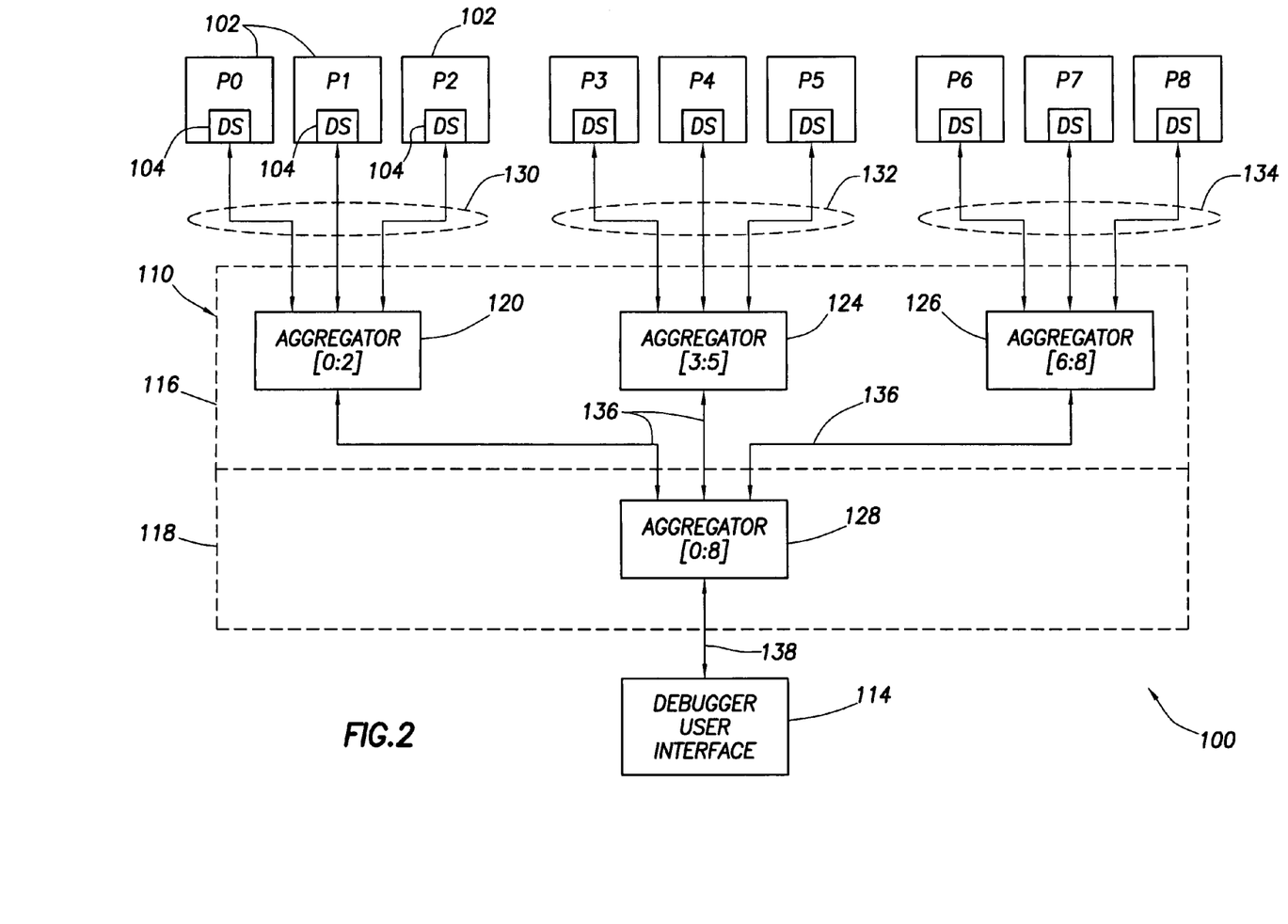
FIG. 2 shows a preferred embodiment of the invention in which a balanced aggregator network is used to couple debug servers associated with processes to a debugger interface.

Referring now to FIG. 2, system 100 is shown constructed in accordance with a preferred embodiment of the invention. As shown, system 100 includes one or more application processes 102 coupled to a debugger user interface 114 via an aggregator network 110. Although nine processes 102 (P0–P8) are shown in FIG. 2, any number of processes can be debugged using the preferred embodiment. Each application process 102 to be debugged preferably includes, or is associated with, a debug server 104 which preferably is a commonly available piece of debug software, such as Ladebug provided by Compaq Computer Corporation, gdb provided from the Free Software Foundation, or dbx from Sun Microsystems, which can be used to set break points, check memory and registers, and other types of debugging tasks initiated via the debugger user interface 114.

Using the debugger user interface 114, a user (e.g., a computer programmer) can send debug commands to one or more of the debug servers and receive messages from the debug servers. The commands may be any commands useful to debugging an application that runs on one or more of the processes 102. Examples of such commands may include commands that set break points in program flow, single stepping through a program, requests for the contents of memory and/or processor registers, and the like. The messages from the debug servers 102 to the user interface 114 may include the content of memory, the content of registers, status information, and other information that may be useful in the debugging process. The user interface 114 itself preferably runs on a process and includes at least one processor, an input device (e.g., a keyboard and mouse) and an output display device.

The aggregator network 110 preferably includes two features which help solve the problems noted above. One feature is that the aggregator network 110 preferably includes a hierarchy structure comprising one or more layers 116 and 118 and one or more aggregators 120, 124, 126 and 128 in each layer. The use of the aggregators to aggregate messages will be described below. For now, it should be understood that the salient feature of the aggregators is that they are one type of communication "node." Each communication node (i.e., aggregator) receives and transmits messages and commands. Using the communication infrastructure shown in FIG. 2, no one process need have more communication channels than is permitted by any reasonable limitations on the system, such as the quantity of open communication channels which may be imposed by the operating system as explained above. As shown in FIG. 2, although there are nine processes 102, each aggregator 120–128 only has four communication channels, one channel for each of four processes/aggregators. In the example of FIG. 2, aggregator 120 communicates with processes P0, P1 and P2 via communication channels 130. Aggregator 124 communicates with processes P3–P5 using communication channels 132 while aggregator 126 has communication channels 134 to processes P6–P8. Each aggregator in layer 116 also has a communication channel 136 to aggregator 128 in layer 118.

Accordingly, aggregators 120–126 have three communication channels 130, 132, 134 to each of three processes and a fourth communication channel 136 to aggregator 128. Aggregator 128 in layer 118 includes the three communication channels 136 to aggregators 120, 124 and 126 and a fourth communication channel 138 to the debugger user interface 114. Rather than having nine communication channels from the processes 102 directly to the debugger user interface, which would be the case with the conventional communication architecture of FIG. 1, the aggregator network 110 of FIG. 2 requires no more than four channels to any one process. The aggregator network 110 of FIG. 2 can be scaled for any number of processes. For example, additional aggregators could be added to layer 116 in the network 110 to communicate with hundreds or thousands of processes. Additionally, the number of communication layers in the aggregator network 110 could be increased beyond just the two shown in FIG. 2. Further still, aggregator 128 (layer 118) is not necessary to the implementation of a communication network which permits a plurality of processes to communicate with a debugger user interface 114 with the number of active communication channels that the operating system permits. Accordingly, aggregators 120–126 in layer 116 could simply communicate with the debugger user interface 114 without communicating through layer 118. Broadly, the preferred embodiment of the invention includes at least one layer of communication nodes, each node communicates with one or more processes and to one or more other communication nodes or to a debugger user interface.

In addition to simply being communication nodes, the aggregators in FIG. 2 also perform another function. Accordingly, the second advantageous feature of the embodiment shown in FIG. 2 is that messages from debug servers 104 to the debugger user interface 114 are analyzed and, when appropriate, combined or otherwise aggregated together. For example, if each debug server 104 transmits the same message (e.g., the current date) ultimately destined for the debugger user interface 114, rather than transmitting nine separate, yet identical, messages to the user interface 114, the aggregator network 110 aggregates those messages preferably into a single message. The single message might include a single instance of the date and an indication that all nine processes 102 transmitted the date. There are numerous possible techniques to analyze and aggregate messages together and several such techniques will be discussed below. The message aggregation preferably occurs without regard to messages being sent from the debug servers 104 to the debugger user interface 114. Messages communicated in the opposite direction (i.e., commands from the debugger user interface 114 to the debug servers) generally are not aggregated.

As shown in FIG. 2, each aggregator 120–128 in the aggregator network 110 analyzes and aggregates its input messages and forwards on an aggregated message to the entity to which it communicates. The aggregators in layer 116 aggregates messages from the debug servers 104 and the aggregator(s) in layer 118 aggregates messages from the layer 116 aggregators. Accordingly, aggregator 120 aggregates messages from the debug servers associated with processes P0–P2. Aggregator 124 aggregates messages from the debug servers associated with processes P3–P5 while aggregator 126 aggregates messages from the debug servers associated with processes P6–P8. Aggregator 128 in layer 118 aggregates messages from aggregators 120–126.

Whenever possible, each aggregator tries to aggregate its input messages together to forward on to the next entity in the communication chain. A plurality of messages may be aggregated into a single message or more than one message. In general, n messages are aggregated into m messages, where m is less than n. The value n is greater than 1 and, by way of example and without limitation, may be greater than 100 or greater than 1000.

Not all messages can be aggregated. Some input messages to an aggregator may be too dissimilar to be aggregated. Non-aggregated messages are simply forwarded on.

A message preferably includes header information containing routing specifics such as a destination address and a data payload. In accordance with a preferred embodiment, with regard to message aggregation, messages generally fall into one of the following three categories:

identical payloads similar payloads completely dissimilar payloads

Figure 3:
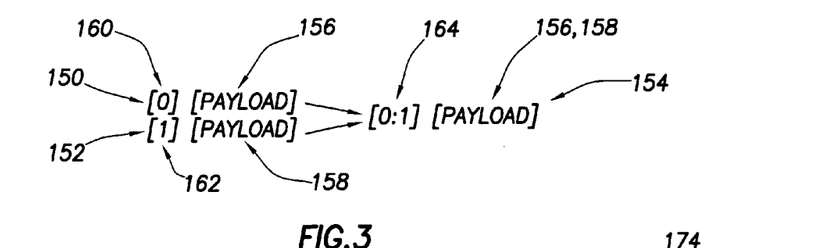
FIG. 3 shows a method of aggregating messages having identical data payloads.

Thus, two or more messages may have identical payloads, similar payloads or payloads too different to benefit from message aggregation. Message aggregation may occur for two or more messages that have identical or similar payloads. If the input message payloads into an aggregator are identical, the aggregator can use those input messages to generate a single output message with a single payload also identifying the processes 102 to which the aggregate message pertains. An example of aggregating messages with identical payloads is shown in FIG. 3. As shown, an aggregator receives two input messages 150 and 152 which have identical payloads 156 and 158, respectively. The difference between messages 150 and 152 is that each originated from a different debug server. Message 150 originated from the debug server associated with process P0 as indicated by numeral 0 in field 160 and message 152 originated from the debug server associated with process P1 as indicated by field 162. The aggregated message 154 preferably includes the same payload (156, 158) as messages 150 and 152. Field 164 includes a process identifier range which identifies the processes to which the aggregated message payload 156, 158 pertains. In the example of FIG. 3, the value in field 164 comprises "0:1" indicating that the payload originated from the debug serves associated with processes P0 and P1.

Figure 4:
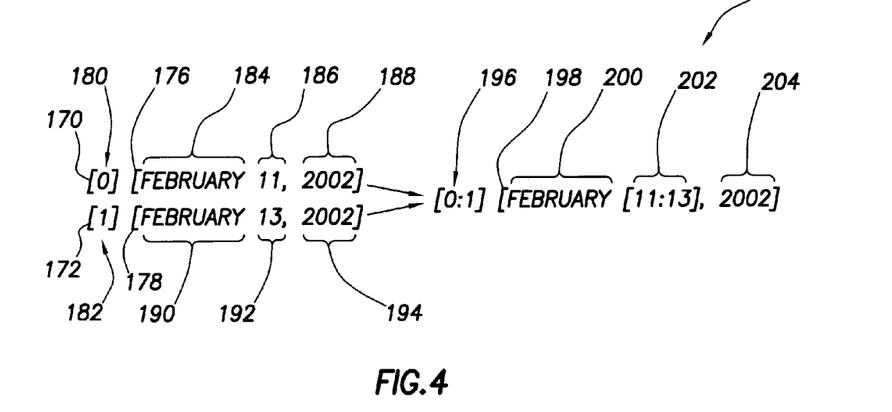
FIG. 4 shows a method of aggregating messages having non-identical data payloads.

FIG. 4 illustrates the use of one suitable message aggregation technique for similar, but not identical, messages. As shown in FIG. 4, messages 170 and 172 are aggregated together by an aggregator to form aggregated message 174. Message 170 originates from process P0 as indicated by field 180 and message 172 originates from process P1 as indicated by field 182. Messages 170, 172 have similar, but not identical, payloads 176 and 178, respectively. Payload 176 in message 170 includes the date data value "Feb. 11, 2002" and payload 178 in message 172 includes the date data value "Feb. 13, 2002". The two date data values are identical except for the dates—11, 13. That is, portions 184, 190 ("FEBRUARY") are identical and portions 188, 194 (", 2002") also are identical. That is, the initial portions 184 and 190 "FEBRUARY" (including the blank space immediately after the word FEBRUARY) in each payload and the ending portions 188 and 194 ", 2002" (including the blank space after the comma) are common to both message payloads. Portions 186 and 192 (values of 11 and 13, respectively) are different.

Aggregated message 174 can be formed as shown without repeating the common portions 184, 188, 190, and 194. Only the dissimilar portions 186, 192 of the data payloads need to be individually identified. In the aggregated message 174, field 196 identifies the processes (P0 and P1 in the example) from which the aggregated message originated. Data payload 198 includes three fields of data values which generally correspond to the three fields of each of the input messages 170, 172. Fields 200 and 204 relate the data values that are common to both input messages. These values are indicated as being common by not including any indication that those values are different in any way. Field 202 includes the data values from the input messages that are different between the messages. These values—11 and 13—are identified as a list of dissimilar data values by the use of predetermined syntax. Although any special syntax can be used, in the example of FIG. 4, the syntax includes brackets around the values and a semicolon indicating a range or a comma individually separating the values. Whether the aggregated messages use a semicolon to indicate a range or a comma to list the differences is a user-selectable feature. Thus, special syntax is used to encode or otherwise identify those data values of the input message payloads 176, 178 that are unique; all other fields of the data payload 198 are assumed to contain data values that are identical to the aggregated messages.

FIG. 4, as shown, retains only the low and high values of the dissimilar fields, and does not retain the origins of the field values. This in itself can be useful to reduce processing and bookkeeping and to enhance speed. Alternate possibilities include retaining all the values and their origins, preferably in a compact form. This would allow a first presentation using a range as shown in FIG. 4, as well as being able to show more detail in expanded presentations. Aggregators could be in modes, e.g., based on time and space versus utility tradeoffs, to discard or retain various degrees of information. This disclosure covers all such cases.

Figure 5A:
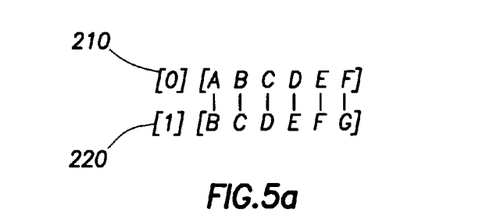
FIGS. 5*a* and 5*b* show an alternative method of aggregating messages having non-identical data payloads.
Figure 5B:
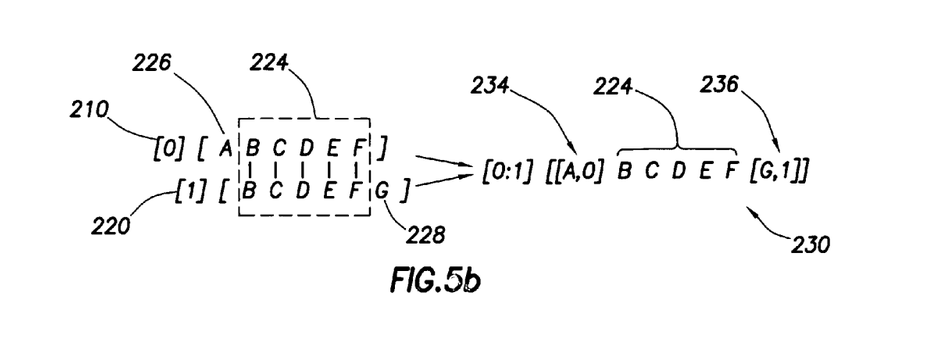

In this way, messages that contain some identical and some non-identical elements of their data payloads can be aggregated into fewer messages, preferably a single message, that effectively provide the same information. FIGS. 3 and 4 illustrate one possible technique for aggregating messages, but numerous other techniques exist and are within the scope of this disclosure. For example, FIGS. 5*a* and 5*b* illustrate another technique. In FIG. 5*a*, message 210 originated from process 0 and has a data payload comprising the value "ABCDEF". Message 220 originated from process 1 and has a data payload comprising the value "BCDEFG". In comparing the two payloads side by side there are no common elements to payloads. However, as shown in FIG. 5*b*, if the data payload of message 220 is shifted by one character, or at least viewed in a shifted format, with respect to the payload of message 210, then it can be seen that the two payloads include common data values. As shown, the values "BCDEF" 224 are common to both payloads, while the values A (226) and G (228) are unique to each message (A being unique to message 210 and G being unique to message 220). The aggregators preferably analyze the data payloads of their input messages to determine if identical alphanumeric strings, albeit in different portions with the payloads, exist in the input messages.

These messages can be aggregated together as shown by message 230 in FIG. 5*b*. The payload comprising the aggregated message 230 indicates that the first value A (234) was an element of only the message from process P0 (message 210). This fact is indicated by including the value A in brackets along with the process number to which that value pertains. Similarly, the ending value G (236) is encoded as being an element of a message from process P1 only. The field 236 in aggregated message 230 contains the common data values, "BCDEF". Again, as noted above, there are numerous ways to encode this type of information besides that shown in FIG. 5*b*.

The example of FIG. 5*b* assumes the values of the aggregated payloads are maintained in the same order. If, however, order is not necessary then the concept of FIG. 5*b* can be extended to reorder payloads to permit aggregation.

The aggregation techniques described above generally pertain to messages being sent from processes 102 to the debugger user interface 114 (FIG. 2). Messages from the processes 102 are aggregated, if possible, by aggregators 120–126 in layer 116. The aggregator 128 in layer 118 preferably aggregates the aggregated and non-aggregated messages from aggregators 120–126 on channels 136. Aggregator 128 compares the messages it receives from the three aggregators 120–126 to determine if any of the messages received from different aggregators can further be aggregated. Also, aggregator 128 determines whether any non-aggregated input messages can be aggregated with either aggregated or non-aggregated messages from other aggregators. The aggregation techniques shown in FIGS. 3 and 4 can be used by aggregator 128 to aggregate messages received from different aggregators 120–126 in layer 116.

Figure 6:
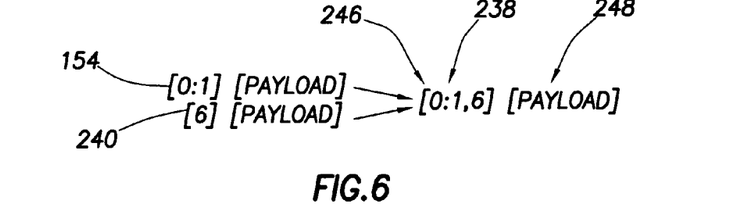
FIG. 6 shows a method of aggregating messages provided from separate aggregators.

FIG. 6 illustrates how a non-aggregated message received from one aggregator 120–126 can be compared to and aggregated with an aggregated message received from a different aggregator. In the example of FIG. 6, aggregator 128 receives two messages 240 and 154. Message 240 originated from process P6 and, according to FIG. 2, passed through aggregator 126. Message 154 is an aggregated message that originated from processes P0 and P1 and was previously described in FIG. 3. Aggregator 128 compares the payloads of the two messages, determines that they are identical and aggregates the two messages together to form aggregated message 246. Message 246 includes a process identifier field 238 which identifies all of the processes that provided messages that became aggregated together in message 246. As such, identifier field 238 includes the values 0:1,6 to indicate that messages from processes P0, P1 and P6 are aggregated together by message 246. The data payload 248 of message 246 is simply the payload from the messages generated by processes P0, P1 and P6.

Further, it is conceivable to have aggregators operate on objects rather than text. Imagine a query of "statistics of age keyed by name." The object would be a set. Each entry is a name and information about age statistics (e.g. n, sum(age), sum(age^2) will allow count, average and standard deviation). "Aggregating" two objects would create a new object that represents the union of the names, but with the statistics entries combined, which in this case is a straightforward summation. This kind of partial aggregation can be done in the aggregator network/tree.

In fact, if the internal representation sorts the set by name, then aggregation can be done in a pipelined/flow-through fashion without having each aggregator read each full object from its inputs before doing the combination, and sending the large result out. Instead, knowing they are sorted allows an aggregator that sees, for example, "Robert" to know it will never see a "David", so that if there are "David"s pending from other channels, it can safely combine and forward.

As described above, aggregators layer 116 aggregate messages from the processes 102, while aggregator(s) in layer 118 aggregate messages from layer 116 aggregators.

The message aggregation described herein pertains to messages being transmitted from the processes 102 to the debugger user interface. By aggregating messages whenever possible, fewer messages are provided to the user and the effort of debugging the application program is made considerably easier and more efficient.

Figure 8:
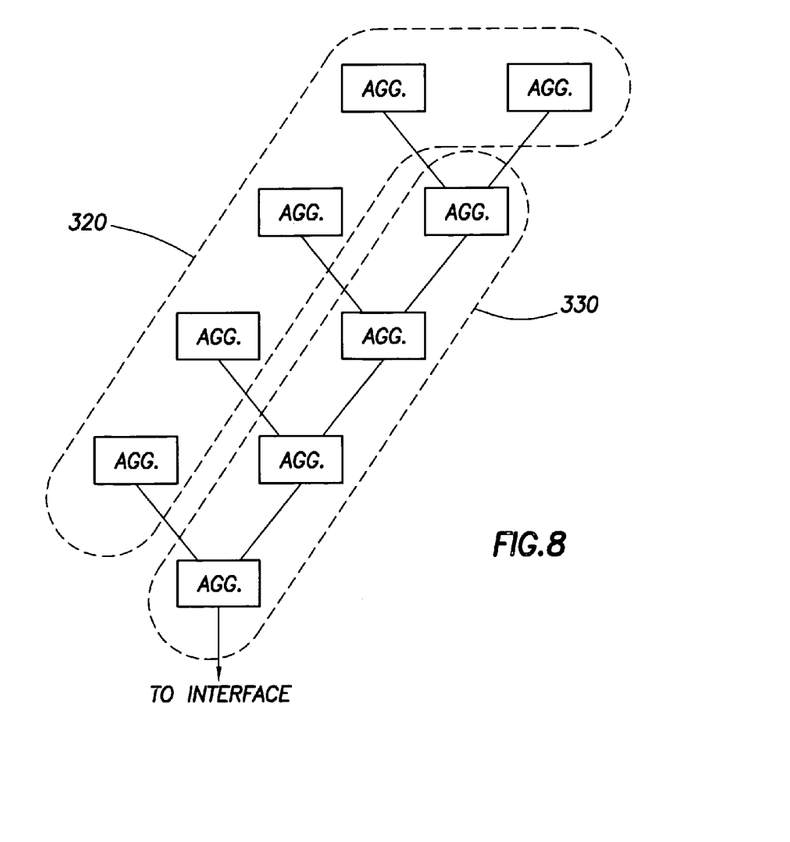
FIG. 8 illustrates one embodiment of an unbalanced aggregator network.

Thus far, a balanced aggregator network has been shown. FIG. 8 shows one embodiment of an unbalanced network. As shown, aggregators 320 may receive inputs from debug servers, while aggregators 330 aggregate messages from other aggregators. The scope of this disclosure includes balanced and unbalanced networks. Further, there is no limit on the depth of the network (i.e., the number of levels in the network).

Figure 7A:
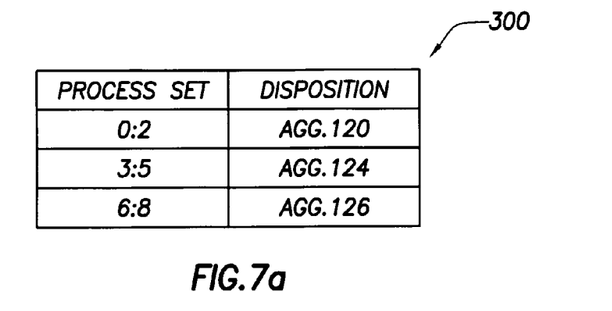
FIGS. 7*a*–7*c* include tables of routing information associated with the aggregator network.

As noted above, commands or other information transmitted by the debugger user interface 114 to the processes 102 generally are not aggregated. Instead, each command is routed by the aggregators 120–128 to the appropriate destination location(s). Each command preferably is encoded with a process number (e.g., 0, 1, 2, etc.) or a process set corresponding to a group of processes as is commonly understood by those skilled in the art. Preferably, each aggregator has access to routing information which is used to determine how to forward commands on to other aggregators/processes. The routing information may take the form, for example, of a table which is loaded into memory. FIG. 7a shows one exemplary embodiment of a routing table 300 which is useful for aggregator 128. As shown, table 300 in FIG. 7a lists the various processes, P0–P8, in the system along with an indication for each process of the layer 116 aggregator through which that process communicates. Accordingly, the routing information preferably states that aggregator 120 includes communication channels to processes P0–P2. Similarly, the routing information may state that aggregator 124 includes communication channels for processes P3–P5, while the routing information indicates that aggregator 126 includes communication channels for processes P6–P8. Aggregator 128 uses the routing information table 300 to determine to which aggregator 120–126 in layer 116 to transmit a command from the debugger user interface. It many cases, a command may need to be routed to processes corresponding to more than one aggregator 120–126. In these cases aggregator 128 preferably broadcasts the command to all of the aggregators that are to receive the command.

Figure 7B:
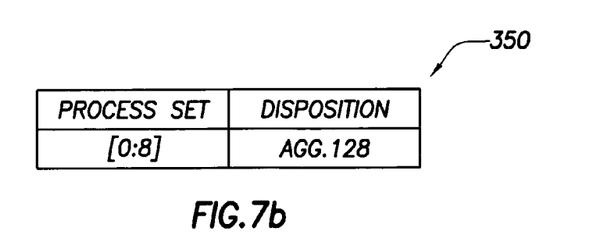
Figure 7C:
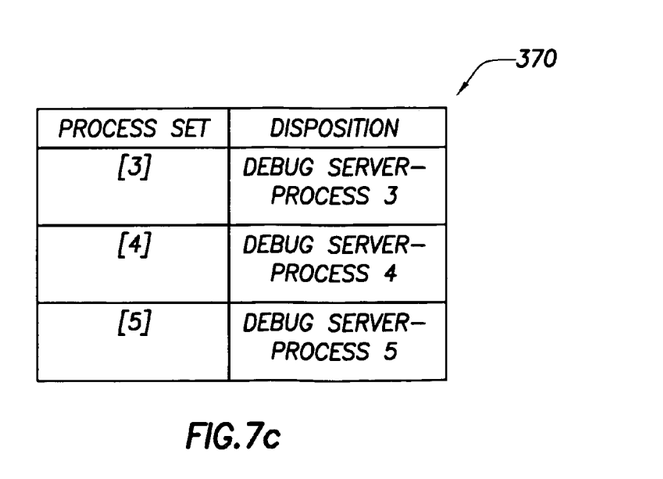

The debugger user interface 114 similarly may have access to a table of routing information which informs the interface to which aggregator to route commands. FIG. 7b shows one suitable embodiment of such a table 350. Each entry in the table 350 includes a process set and a routing disposition. Because the exemplary embodiment of FIG. 2 shows the interface 114 only coupled to one aggregator (aggregator 128), table 350 includes only a single entry. Other entries could be included if the interface 114 coupled to other aggregators. Further, each of aggregators 120, 124, 126 also have access to a routing table. An exemplary table 370 is shown in FIG. 7c for aggregator 124.

The debugger user interface 114 will generally receive both aggregated and unaggregated messages from the processes 102 via the aggregator network. The messages can be dealt with in any desirable manner. For example, the messages can simply be logged to a file. Further, the messages can be viewed on a display (not shown) that is part of the debugger user interface 114. If desired, and if sufficient information is available, aggregated messages can be converted back to their unaggregated form. This conversion process will essentially be the reciprocal process from that used to generate the aggregated messages in the first place. In general, the individual unaggregated messages can readily be recreated because each aggregated message identifies the processes from which the messages originated. Further, in the case of aggregated messages based on similar, but not identical, messages, such aggregated messages can be converted back to the original unaggregated messages if the aggregated messages retain the origins of the dissimilar payloads. Using this information, aggregated messages can be converted to their original unaggregated form.

The use of an aggregator network, such as the network described herein, advantageously solves or alleviates the problems discussed previously. First, the detrimental effects caused by the limitation as to the number of active communication channels that can be open at a time for any one process is avoided through the use of multiple, hierarchically-arranged aggregator processes in the aggregator network. Second, messages from the various processes can be aggregated within the tree, often concurrently with other aggregators, into preferably fewer messages to permit more efficient operation. The benefit of message aggregation increases as the number of processes in the system increases. The architecture is readily scalable to any number of processes (e.g., 100 or more or 1000 or more processes), and may provide significant advantages over conventional architectures (e.g., FIG. 1) when used in conjunction with 64 or more processes/debug servers.

The above discussion is meant to be illustrative of the principles and various embodiments of the present invention. Numerous variations and modifications will become apparent to those skilled in the art once the above disclosure is fully appreciated. For example, the preferred aggregation technique described herein can be applied to messages that contain text, reply objects, or any other type of payload. It is intended that the following claims be interpreted to embrace all such variations and modifications.

What is claimed is:

1. A computer system, comprising:
    a plurality of processes;
    a debugger user interface usable to coordinate debugging activity of an application running on said processes; and
    an aggregator network coupled to said processes and said debugger user interface, said aggregator network aggregates together messages from two or more of said processes and provides aggregated messages to said debugger user interface.

2. The computer system of claim 1 wherein said aggregator network also provides unaggregated messages from said processes to said debugger user interface.

3. The computer system of claim 1 wherein said aggregator network comprises a plurality of aggregators, each aggregator having communication channels to some, but not all, of said processes.

4. The computer system of claim 3 wherein said aggregator network also includes at least one aggregator that has communication channels to other aggregators and aggregates messages from such other aggregators.

5. The computer system of claim 3 wherein said aggregator network also includes at least one aggregator that has communication channels to other aggregators and to said debugger user interface.

6. The computer system of claim 1 wherein said aggregator network determines whether messages from different processes have identical payloads and aggregates such messages with different payloads into an aggregated message.

7. The computer system of claim 1 wherein said aggregator network determines whether messages from different processes have non-identical payloads with some common data values and aggregates such messages into an aggregated message.

8. The computer system of claim 7 wherein said aggregated message indicates the common data values and uncommon data values and, for the uncommon data values, identifies the processes from which the uncommon data value originated.

9. The computer system of claim 7 wherein said aggregator network includes an aggregator that receives aggregated and unaggregated Input messages and determines if any of said input messages can be further aggregate and, if so, aggregates such messages.

10. The computer system of claim 1 wherein said aggregator network includes a plurality of layers, each layer having at least one aggregator. and said aggregator network includes a first layer whose at least one aggregator couple to said processes and a second layer whose at least one aggregator couple to the at least one aggregator in the first layer.

11. The computer system of claim 10 wherein said aggregator network includes three or more layers of aggregators coupled together.

12. The computer system of claim 1 wherein said aggregator network includes a first plurality of communication nodes coupled to said processes and to a second communication node, said second communication node coupled to said debugger user interface, and each communication node in said first plurality is coupled to at least one, but not all, of said processes, and said processes transmit messages through said first plurality of communication nodes to said second communication node.

13. A computer system, comprising:
a plurality of processes, at least one process comprising a processor; and
a first plurality of communication nodes coupled to said processes and to a second communication node, each communication node in said first plurality coupled to at least one, but not all, of said processes;
wherein said processes transmit messages through said first plurality of communication nodes to said second communication node; and
wherein said first plurality of communication nodes combines messages from said processes into aggregated messages;
wherein each of said messages has a size and the size of at least one aggregated message is smaller than the combined size of the messages combined to form said at least one aggregated message.

14. The computer system of claim 13 wherein said first plurality of communication nodes provides aggregated messages to said second communication node.

15. The computer system of claim 14 wherein said first plurality of communication nodes also forwards on to said second communication node unaggregated messages from said processes.

16. The computer system of claim 13 wherein said second communication node aggregates messages from said first plurality of communication nodes.

17. The computer system of claim 13 wherein said first plurality of communication nodes determines whether messages from different processes have identical payloads and aggregates such messages with different payloads into an aggregated message.

18. The computer system of claim 13 wherein said first plurality of communication nodes determines whether messages from different processes have non-identical payloads with some common data values and aggregates such messages into an aggregated message.

19. The computer system of claim 18 wherein said aggregated message indicates the common data values and uncommon data values and, for the uncommon data values, identifies the processes from which the uncommon data value originated.

20. The computer system of claim 18 wherein said second communication node receives aggregated and unaggregated input messages from said first plurality of communication nodes and determines if any of said input messages can be further aggregated and, if so, aggregates such messages.

21. The computer system of claim 13 wherein said first plurality of communication nodes and said second communication node are arranged in a plurality of communication layers.

22. A method of providing information between a plurality of processes on which an application executes and a debugger user interface, the information usable in debugging activity of said application, said method comprising:
receiving a plurality of messages from a plurality of said processes;
determining if said messages have any common data values; and
combining n messages from said plurality of messages into m messages, wherein m is less than n; providing said m messages to said debugger user interface.

23. The method of claim 22 wherein m equals 1.

24. The method of claim 22 wherein n is greater than 100.

25. The method of claim 22 wherein n is greater than 1000.

26. The method of claim 22 wherein said combined m messages include an identification of the processes from which the n messages originated.

* * * * *

UNITED STATES PATENT AND TRADEMARK OFFICE
CERTIFICATE OF CORRECTION

PATENT NO.         : 7,055,139 B2
APPLICATION NO. : 10/109287
DATED              : May 30, 2006
INVENTOR(S)        : Susanne M. Balle et al.

It is certified that error appears in the above-identified patent and that said Letters Patent is hereby corrected as shown below:

In column 11, line 10, in Claim 8, delete "value" and insert -- values --, therefor.

In column 11, line 13, in Claim 9, delete "Input" and insert -- input --, therefor.

In column 11, line 14, in Claim 9, delete "aggregate" and insert -- aggregated --, therefor.

In column 11, line 18, in Claim 10, delete "one aggregator." and insert -- one aggregator, --, therefor.

In column 12, line 23, in Claim 19, delete "value" and insert -- values --, therefor.

Signed and Sealed this

Twenty-eighth Day of July, 2009

JOHN DOLL
*Acting Director of the United States Patent and Trademark Office*